April 30, 1935. E. SCHMIERER 1,999,789
APPARATUS FOR EXTRACTING JUICES
Filed March 30, 1933 2 Sheets-Sheet 1

Eugene Schmierer
INVENTOR

Patented Apr. 30, 1935

1,999,789

UNITED STATES PATENT OFFICE 1,999,789

APPARATUS FOR EXTRACTING JUICES

Eugene Schmierer, Saginaw, Mich., assignor to Baker Perkins Company, Inc., Saginaw, Mich., a corporation of New York Application March 30, 1933, Serial No. 663,528

5 Claims. (Cl. 99—2)

This invention relates to the extraction of fruit and vegetable juices, and more particularly to an apparatus for extracting fruit and vegetable juices which are rich in vitamins and which will retain more of these vitamins than has heretofore been possible.

It is well known that vitamins, particularly the antiophthalmic, antineuritic, antiscorbutic and antipellagric vitamins, which are found abundantly in some fruit and vegetables, are essential to the development, maintenance and well being of the human body.

During the warm months of the year when fruit and vegetables are plentiful, there are sufficient vitamins in the average diet to maintain proper growth, development and resistance to disease, but during the winter months when fresh fruits and vegetables are scarce and difficult to procure, it has been the practive to can or preserve them. The method of canning and preserving used heretofore destroyed many of the vitamins and left a bulk of roughage which appeased the appetite without supplying the required amount of vitamins. It therefore became desirable to supply the vitamins in concentrated form by eliminating the roughage and preserving the juices.

In the methods of extracting the juices used heretofore many of the vitamins were lost in the process, because some vitamins are very sensitive to heat, others to oxidation and still others are extremely sensitive to heat when oxygen is present. In certain fruits and vegetables certain of the vitamins are found in large quantities in the sound fruit cells and in this condition are fairly stable; consequently, in order to have a fruit juice with a high vitamin content, it was necessary to maintain these sound fruit cells in their natural state, that is, unruptured. In this condition the juices were too thick for beverage purposes. If it was desired to produce these juices in a more liquid state suitable for beverage purposes, the sound fruit cells had to be ruptured and as the fruit cells also contain enzymes, which are particularly active in the presence of oxygen, many of the vitamins were destroyed by the chemical reaction set up by the liberated enzymes.

Tests and experiments have proved that when the juices are extracted in the presence of oxygen, most of the vitamins are destroyed in from six to ten minutes, particularly the antiscorbutic vitamin, which is necessary for the prevention of decalcification of the bone, decay of the teeth, loss of weight, and loss of appetite.

In the processes employed heretofore it was customary to crush the fruit, press out the juice and then transfer it from the presses as rapidly as possible to cooking kettles where the temperature was rapidly raised to a boiling point in order to drive out the oxygen which was present in the juice. The high temperatures, the presence of oxygen and the length of time required to drive out the oxygen from the juice destroyed much of the vitamin content, and in addition affected the natural flavor.

My present invention contemplates an apparatus in which the fruit or vegetables may be continuously or intermittently fed into an air tight compartment to which a vacuum is applied, the fruit crushed, the juices extracted, the pulp removed and the juices conducted to the cooking or preserving apparatus all under vacuum.

It is therefore a prime object of my invention to eliminate the oxygen from the juice of fruits and vegetables, thus obviating the necessity of high temperatures which were necessary heretofore for driving out the oxygen with its consequent destruction of vitamins and loss of natural fresh flavor.

It is a further object of my invention to break up the sound fruit cells, thereby liberating the juices and vitamins contained therein, and produce a clearer, more liquid concentrate of juices, which is better suited for beverage purposes.

It is a still further object of my invention to provide an apparatus which is simple, positive, economical and practical in operation.

Finally, it is an object of my invention to provide an apparatus in which the fruit and vegetables are fed to a crushing and pressing device without breaking the vacuum in the tank containing said crushing and pressing devices.

With these and certain other objects in view, my invention comprises the devices described and claimed and the equivalents thereof.

In the drawings, Fig. 1 is a vertical section through an illustrative embodiment of my invention.

Figure 3:
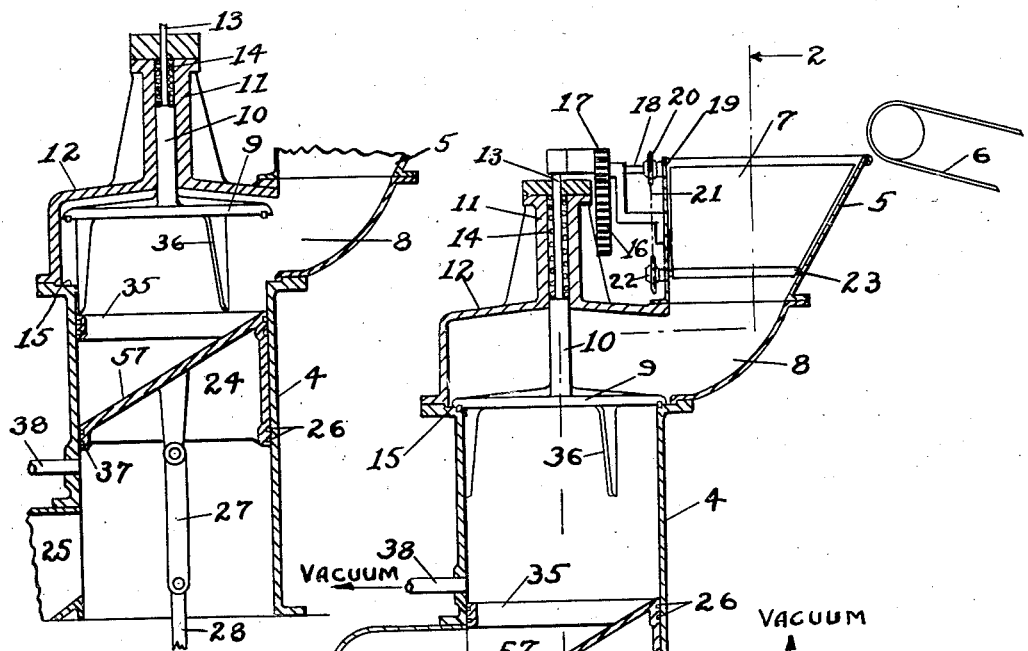
Figure 3 is a detail of the feeding chamber shown in Figure 1 with the carrier in a raised position as will hereinafter be described.
Figure 1:
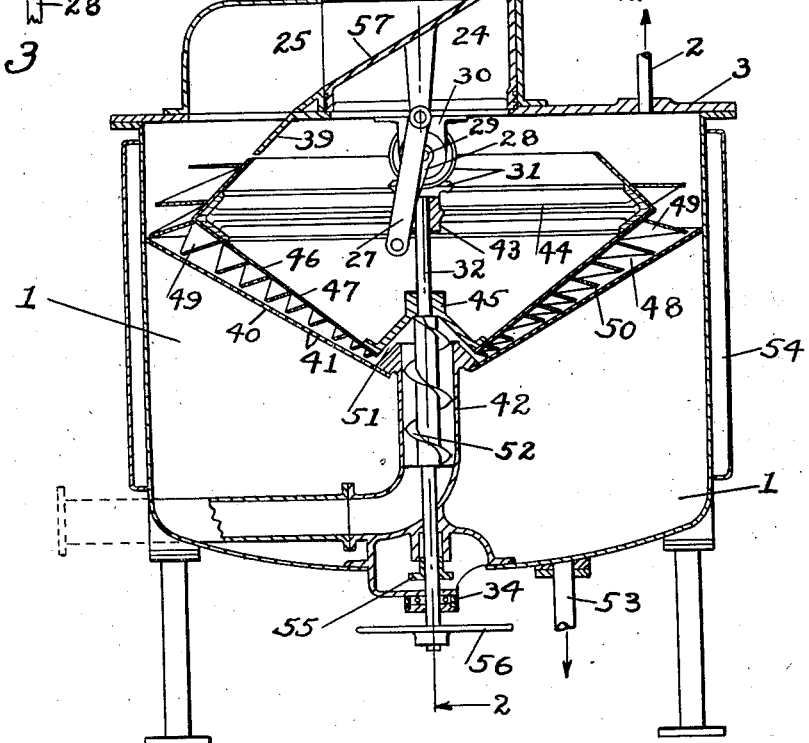

The illustrative embodiment of my invention comprises an air tight tank 1 to which vacuum is applied preferably through a pipe 2 located on the cover 3 and connected to a vacuum pump not shown. On the cover 3 of the tank 1 is secured a feeding chamber 4 communicating at its lower end with the interior of the tank 1 and at its upper end with a distributing hopper 5.

Figure 2:
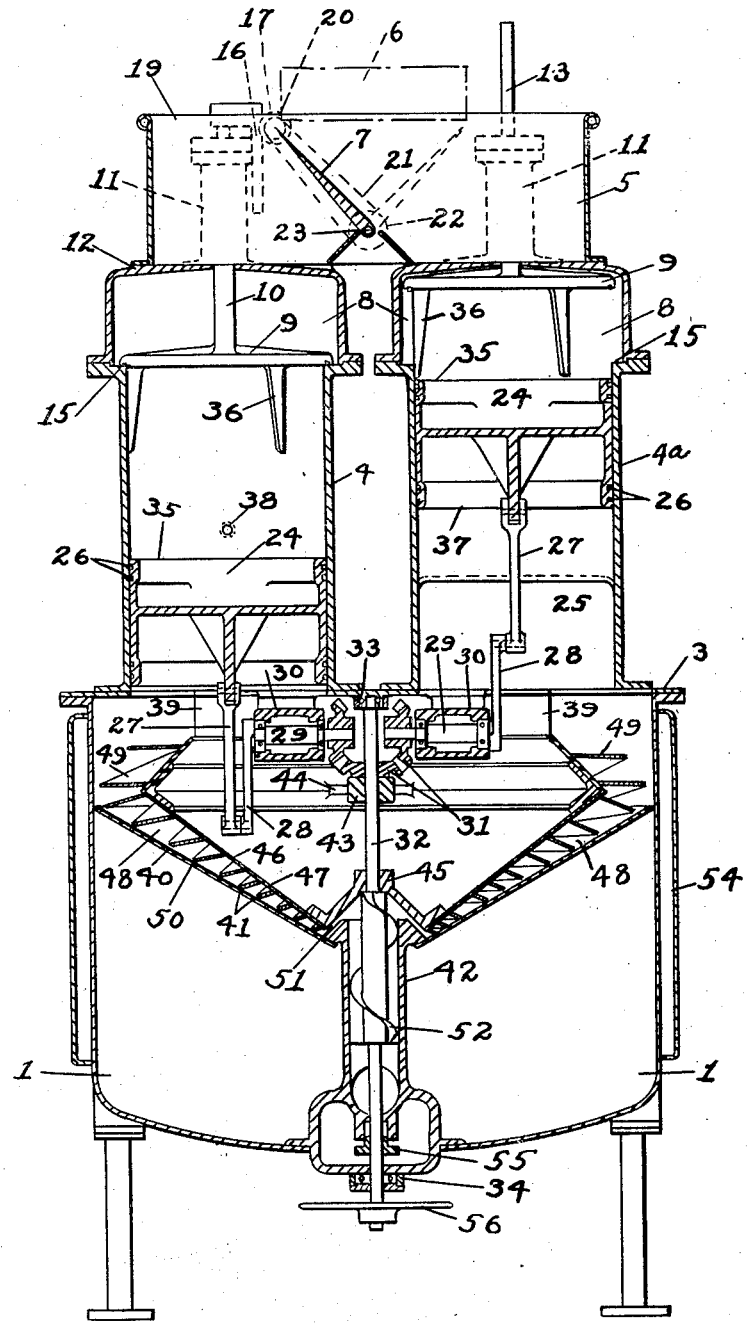
Figure 2 is a vertical section on the line 2—2 of Figure 1.

When it is desired to feed fruit continuously to the crushing elements, two or more of these feeding chambers as 4 and 4a may be mounted on the cover 3 of the tank as shown in Figure 2.

Fruit may be fed in sufficient quantities to the distributing hopper 5 by means of a conveyor 6, belt, elevator, or may be fed direct from a hopper located above. When the device is equipped with more than one supply chamber, an oscillatable chute 7 is located in the distributing hopper 5 which alternately directs the fruit into the various supply chambers.

The passageway 8 between the distributing hopper 5 and feeding chamber 4 is closed by a valve 9 having a central guide stem 10 projecting upwardly through a boss 11 on the top cover 12 of the feeding chamber 4. The upper part of the guide stem 10 has a reduced diameter 13 and is surrounded by a spring 14 adapted to normally urge the valve 9 toward its seat 15 on the upper rim of the feeding chamber 4.

Secured to the top part of one of the valve stems 13, where it projects beyond the boss 11 is a rack 16 which meshes with a pinion 17 on a shaft 18 suitably journaled to an upright wall 19 of the distributing hopper 5. Keyed to this shaft 18 is a sprocket wheel 20 connected by a chain 21 to a second sprocket wheel 22, keyed on a shaft 23, journaled in the walls of the feed hopper 5, and to which is secured the lower end of the oscillatable chute 7. Thus, as the valve 9 is raised and lowered, the rack 16, which is secured to the upper end of the guide stem 10, rotates the pinion 17, shaft 18 and sprockets 17 and 22, and thus the chute 7 is automatically oscillated about its shaft 23 to alternately feed the fruit into one or the other of the feeding chambers 4 and 4a. The movement of the valve 9 will be described hereinafter.

Located within the feeding chamber is a reciprocable carrier 24 adapted alternately to receive the fruit from the distributing hopper and conduct it to the entrance port 25 of the tank 1 where it is discharged into the crushing elements. The carrier 24 operates in the feeding chamber with a tight sliding fit, which is preferably augmented by packing rings 26 around the outer periphery of the carrier 24 so that no air is admitted to the tank when the valve 9 is open. A link 27 connects the carrier 24 to a crank 28 keyed on the end of a counter-shaft 29, journaled in suitable bearings 30 secured to the under side of the tank cover 3 and which is driven by suitable gearing 31 from the main drive shaft 32 extending axially through the tank and suitably supported at its upper end in a bearing 33 also secured to the tank cover 3 and at its lower end by a bearing 34 located outside the tank. When two feeding chambers are used, as shown in Figure 2, the cranks 28 connected to each carrier 24 are set 180 degrees to each other, so that as one carrier is receiving its fruit from the distributing hopper 5, the other carrier is discharging its fruit to the crushing elements.

On the up-stroke of the carrier the upper edge 35 engages projections 36 on the valve 9 which extend downwardly into the feeding chamber. The projections 36 also act as guides against the inner surface of the feeding chamber to properly seat the valve 9 on its seat 15. At the instant the upper part 35 of the carrier engages the projection 36, the lower edge 37 is above the entrance port 25 and the tank is sealed off from the feeding chamber so that no air is admitted to the tank when the valve 9 is lifted. Continued upward movement of the carrier lifts the valve from its seat 15 against spring pressure, and also causes the pinion 17 and sprockets 20 and 22 to rotate and thus oscillate the chute 7 to the dotted position shown in Figure 2, so that the fruit is delivered into the carrier while in its raised position as shown in Figure 3.

As the carrier starts on its downward stroke it is followed by the valve 9 which seats under spring pressure. At this moment the feeding chamber is entirely shut off from the outside atmosphere and from the tank so that the air which enters the feeding chamber with the fruit is now trapped between the valve 9 and the bottom portion 37 of the carrier.

To prevent this air from entering the tank a vacuum pipe 38 is connected to the feeding chamber and all oxygen entrapped between the carrier 24 and the valve 9 is withdrawn so the fruit is now in a vacuum. Continued downward movement of the carrier uncovers the feeding port 25 to the crushing chamber in tank 1, and the fruit is now fed directly to the crushing element over suitable chutes 39 attached to the cover 3.

Any type of crushing element may be used, but for illustrative purposes I show a cone-shaped screen 40 having therein perforations 41 of predetermined size, depending upon the nature of the fruit or vegetables and the degree of fineness to which they are to be crushed. The upper edge of the screen 40 is secured to the inner walls of the tank 1 and the lower edge is supported by a discharge pipe 42.

Rotatably secured to the drive shaft 32 by a hub 43 and suitable arms 44 at its top and a bearing 45 at its apex and axially spaced from the screen 40 is a crusher consisting of a conical drum 46 whose walls 47 have a steeper angle than the screen 40 so that the passage 48 formed between the crusher 46 and screen 40 converges toward its apex. Around the periphery of the crusher 46 are arranged spiral blades 49 whose outer edges 50 are arranged either to just clear the screen 40 or drag over its surface depending on the condition of fineness required. These spiral blades 49 convey the fruit in the passage 48 between the crusher 46 and screen 40 and crush it thereon. Thus the fruit, being forced by the blades through this passageway 48, is gradually crushed, the juice passing through the perforations 41 in the screen 40 and the pulp being conducted through a passageway 51 into the top of the discharge pipe 42 which supports the lower end of the screen 40.

Located in the discharge pipe 42 is a screw 52 secured to the driving shaft 32 and which conducts the pulp from the passageway 51 between the crusher and screen through the discharge pipe 42 and out of the machine where it is discharged into suitable air-tight containers, or through suitable valves so as to maintain a vacuum in the machine. The juice collected in the tank is drawn out either continuously or as needed by a discharge pipe 53 to vacuum cookers not shown and thence to the bottling or canning machines.

It is sometimes preferable to pretreat the juices in the tank as they are being pressed out, in which case the tank 1 is provided with a jacket 54 through which a heating or cooling medium may be circulated.

To preserve the vacuum in the tank at the point where the shaft passes through the tank 1, I provide the usual packing gland 55, which is located between the bottom of the pulp discharge pipe 42 and the lower drive shaft bearing 34.

The moving parts of the device are driven either by direct connection from a motor not shown or from any suitable source of power connected to a sprocket 56 keyed to the end of the drive shaft 32 where it passes out of the machine and below the lower bearing 34.

The operation of the machine is as follows, reference being had to the drawings, particularly Figure 2:

Fruit is fed to the supply hopper 5 by the usual belt or elevator 6 which is so timed as to supply sufficient fruit to suit the capacity of the machine.

Referring to Figure 2, the carrier 24 in the right hand feeding chamber 4a is in its raised position with the valve 9 full open. Fruit is fed to the carrier in a sufficient amount to completely fill the cylindrical carrier which then starts on its down stroke followed by the valve 9 which seats before the discharge port 25 has been uncovered. The vacuum pipe 38 removes all the air which entered the feeding chamber when the valve 9 was opened. At the same instance that the carrier in the right hand feeding chamber 4a starts down, the carrier in the left hand chamber 4 starts to move upwardly. The chute 7 is then swung to the right, shown in dotted position in Figure 2, and as the valve 9 on the left hand feed chamber 4 uncovers, the fruit is fed therein, the right hand carrier 4a in the meantime has uncovered the feeding port 25. The fruit flows from the sloping bottom 57 of the carrier 24 over the guide chute 39 and into the crushing elements where it is crushed and the juice squeezed from the pulp by the converging passageway 48 between the screen 40 and crusher 46, the pulp in the meantime being carried through the discharge passage 51 into the discharge pipe 42 where it is forced out of the machine into air tight containers or to suitably controlled rotating valves not shown to prevent the air from entering the tank. The juice is then drawn off into suitable vacuum cookers and thence to the vacuum bottling or canning process.

By the above described means I have produced an apparatus which will extract the juices from fruit and vegetables without having the broken fruit come in contact with any oxygen. I have also produced an apparatus which may be continuously or intermittently fed with fruit and vegetables and in which the feeding, crushing and extracting of the juices are carried out in a vacuum. I have also produced an apparatus which is positive and inexpensive in operation and which requires very little attention.

It is to be understood that the devices shown are merely illustrative of one mode of constructing the apparatus. Certain modifications may be made without departing from the spirit of my invention.

Having thus described my invention, what I claim and desire to secure by Letters Patent is:

1. A feeding device for vacuum treating machines comprising a plurality of feed chambers each having an inlet port at the top thereof, a vertically reciprocating carrier in each of said feed chambers, means to reciprocate said carriers, a valve at the top of each of said feed chambers adapted to open said inlet port when the reciprocating carriers are at the top of their upward strokes, a hopper communicating with the inlet ports of said feed chambers, an oscillating chute in said feed hopper, means connecting said chute and said valves, adapted to cause material delivered to said hopper to be directed to said carriers in timed relation to the upper stroke of said carriers, a port at the lower end of each of said chambers adapted to communicate with the carriers in their lower positions and means for withdrawing the air which enters said feed chambers with the material.

2. A feeding device for vacuum treating machines comprising a feed chamber having an inlet port at the top thereof, a vertically reciprocating carrier in said feed chamber, means to reciprocate said carrier, a valve at the top of said chamber for controlling said inlet port, means to open said valve when the reciprocating carrier is at the top of its upward stroke, a hopper communicating with the inlet port of said feed chamber, a port at the lower end of said chamber adapted to communicate with the carrier at its lower position and means for withdrawing the air which enters said feed chamber with the material.

3. A feeding device for vacuum treating machines comprising a feed chamber having a discharge port at one end and an entrance port at the other end, a reciprocating carrier in said feed chamber adapted to alternately communicate with said ports and receive material from the entrance port and discharge it at the discharge port, means to reciprocate said carrier, a valve covering the entrance port and means to open said valve as the carrier nears that end of its stroke, a hopper communicating with the entrance port, and means for withdrawing the air entering said feed chamber with the material.

4. A feeding device for vacuum treating machines, comprising a feed chamber having at least two ports through which the material passes, a valve closing one of said ports, a reciprocating carrier in said feed chamber, and adapted to alternately communicate with said ports, receive material from one of the ports, and discharge it through the other port, means to open said valve in timed relation with the travel of said reciprocating carrier toward said valve, and means to withdraw the air which enters the said feed chamber with the material.

5. A feeding device for vacuum treating machines, comprising a feed chamber having feed and discharge ports, a closure for one of said ports, a traveling carrier in said feeding chamber adapted to alternately communicate with said ports, receive material from one port and discharge it through the other port, means to open said closure to deliver material to said carrier, and means to withdraw the air which enters the said carrier with the material while both ports are closed.

EUGENE SCHMIERER.